(12) United States Patent  (10) Patent No.: US 7,189,106 B2
Young  (45) Date of Patent: Mar. 13, 2007

(54) ELECTRIC ADAPTER ORGANIZER

(76) Inventor: Eric D. Young, 200 E. 94th St., Apt. 1215, New York, NY (US) 10128

( * ) Notice: Subject to any disclaimer, the term of this patent is extended or adjusted under 35 U.S.C. 154(b) by 0 days.

(21) Appl. No.: 11/130,943

(22) Filed: May 17, 2005

(65) Prior Publication Data

US 2006/0264094 A1    Nov. 23, 2006

(51) Int. Cl.
*H01R 13/72* (2006.01)
*H05K 5/03* (2006.01)
(52) U.S. Cl. ............ 439/501; 439/502; 439/4; 174/67
(58) Field of Classification Search ........ 439/501, 439/502, 4; 174/67, 53, 47–48, 135; 320/111, 320/107
See application file for complete search history.

(56) References Cited

U.S. PATENT DOCUMENTS

| 5,323,099 | A | 6/1994 | Bruni et al. |
| 5,457,600 | A | 10/1995 | Campbell et al. |
| 5,629,826 | A | 5/1997 | Roca et al. |
| 5,772,036 | A | 6/1998 | Muncy et al. |
| 5,923,146 | A | 7/1999 | Martensson |
| 6,059,081 | A | 5/2000 | Patterson et al. |
| 6,369,999 | B1 | 4/2002 | Wohlgemuth et al. |
| 6,597,557 | B2 | 7/2003 | Hunter |
| 6,623,294 | B2 | 9/2003 | Tse et al. |
| 6,756,543 | B1 | 6/2004 | Kaloustian |
| 6,806,682 | B2 | 10/2004 | Hsiao |
| 6,858,951 | B2 | 2/2005 | Liao |
| 6,861,822 | B2 | 3/2005 | Wei |
| 6,969,275 | B1* | 11/2005 | Brock .................. 439/502 |
| 2003/0111978 | A1 | 6/2003 | Wang |
| 2005/0046385 | A1 | 3/2005 | Chung |

FOREIGN PATENT DOCUMENTS

| EP | 0 841 804 A2 | 5/1998 |
| EP | 1 311 046 A1 | 5/2003 |
| JP | 10-341538 | 12/1998 |
| WO | WO 02/052687 | 7/2002 |
| WO | WO 03/086929 A1 | 10/2003 |
| WO | WO 2004/14490 A1 | 12/2004 |

OTHER PUBLICATIONS

Advertisement of "Power Station", manufacutred and distributed by ReSource, Inc., 23 Acorn Street, Providence, RI 02903, U.S.A. (2004).

* cited by examiner

*Primary Examiner*—Hien Vu
(74) *Attorney, Agent, or Firm*—Dickstein Shapiro LLP

(57) ABSTRACT

An organizer for organizing and storing one or more of adapters provided with rechargeable devices includes an AC power supply to provide access to electricity for the adapters to permit one or more of the adapters to operate simultaneously; a mechanism for storing excess adapter wiring; and a mechanism adapted to permit selectively extension or retraction of the wire of the adapter.

7 Claims, 10 Drawing Sheets

ELECTRIC ADAPTER ORGANIZER

FIELD OF THE INVENTION

The present invention relates generally to the organization and storage of electrical adapters associated with electronic devices that operate on rechargeable batteries, such devices generally being referred to as "rechargeable devices." The adapters function to transform high voltage AC electricity from a wall outlet to the lower voltage DC electricity and appropriate amperage necessary to operate and recharge the related rechargeable device.

BACKGROUND OF THE INVENTION

A wide and growing variety of electrical devices are designed to operate using rechargeable batteries, and operate and recharge their batteries by means of a connection to an adapter that converts high-voltage AC electricity available, for example, from a wall outlet in the home, into the low-voltage DC electricity and appropriate amperage necessary to operate and recharge these devices. Each of these devices is manufactured to precise specifications requiring specific voltages and amperages and for this reason the manufacturers of the devices generally include with such devices a specialized adapter. To avoid mismatching of the devices with the adapters, the manufacturers fit each adapter with a unique connection output end and each device with a matching receptacle capable of receiving only the matched adapter. The use of an improper adapter may damage the rechargeable device and may also void the manufacturer's warranties.

Generally, the adapters are required only when the batteries of the rechargeable devices run low. Therefore, for much of the time the adapter must be stored. Moreover, to accommodate various potential placements of the adapter/rechargeable device combination, the wires used by the adapters tend to be quite long, often significantly in excess of that actually needed. Also, because many of the rechargeable devices are mobile, such as mobile telephones, pagers or wireless e-mail units, it is advantageous if the consumer can easily remove the adapter from its storage/use location when needed for travel.

It is not uncommon for a contemporary household to own ten or more rechargeable devices, and therefore, ten or more unique adapters. The existing options for storing these adapters is inadequate. If a consumer is somewhat organized he or she may centralize the location of these adapters, for example in a drawer. This, however, leads to the familiar "rat's-nest" of wires and plugs.

Moreover, manufacturer's often do not place identifying markers on the adapters, so this "organized" consumer must still tangle with the wires and struggle to identify the appropriate adapter for a particular device. Additionally, with so many rechargeable devices, it may be difficult to locate a sufficient number of convenient electric wall outlets to permit the consumer to charge multiple devices simultaneously. This situation can result in wires being strung throughout the home, with exposed wires lying in the open creating the potential that the rechargeable device will be damaged, for example if the wire is pulled and the device falls. In addition, the situation may present a potentially dangerous electrical hazard.

Attempts have been made to ease some of the above-noted problems. However, the existing options, such as they are, typically only deal with one of the number of problems previously identified.

For example, power strip devices, which provide multiple inline AC outlets, are readily available. However, among other shortcomings, power strips do not solve the above-noted problems relating to the excess wire, the storage of the adapters when the adapters are not in use, or the easy organization of the adapters for travel.

Twist-ties and similar devices are known and are used to store and organize the excess cable. However, the wire loops created by bunching up the wires in this fashion are almost as problematic as the fully extended wires and this solution does nothing with respect to any of the other problems associated by these adapters.

Recently, the so-called "Power Station" has been introduced. The Power Station attempts to address the problems discussed above. However, the Power Station also fails to address the majority of the problems addressed by the present invention. This device is essentially an enclosure for a power strip. The connection end of the adapter remains always exposed and there is no means to lengthen and retract this end of the adapter. Also, the unit can accommodate only three adapters and as designed the unit is incapable of dealing with large "in line" adapters such as those used by portable camcorders and lap-top computers. Moreover, this product does not provide adequate space for more cumbersome devices, such as portable DVD players and camcorders, to rest during the charging process. Finally, this device relies only on the twist-tie wire organization method, which as noted above is inadequate.

Other prior art devices in this area focus on the "wire-is-too-long" problem and incorporate wire retraction devices to deal with this problem. However, such devices have approached solving this problem by creating new adapter designs, rather than utilize the adapters provided by the manufacturer.

Other attempts at a solution only replace one adapter with another, and those that constitute a replacement "universal" adapter have significant shortcomings. First, the use of such replacement adapters may damage the rechargeable devices and may actually void the manufacturer's warranty. Second, the use of such a device requires the user to continuously substitute connection ends to fit the various rechargeable devices and to make other adjustments, e.g., to voltage/current settings, so the output of the adapter matches the requirements of the rechargeable device. Finally, such attempts at a solution do not deal with the problems relating to the distribution of electricity described above.

SUMMARY OF THE INVENTION

The present invention relates to a unit capable of storing one or more recharging adapters, such adapters in general being referred to hereinafter as "adapters," incorporating high-voltage electrical outlets. The unit includes one or more spools to organize and contain excess adapter wire and a mechanism to permit the manual extension of the low-voltage DC output connection end of the adapter (the "output connection end") out of the unit to reach the rechargeable device when needed, and the manual, preferably spring assisted, retraction of the output connection end into the organizer, when it is no longer needed for recharging.

In view of the problems of the prior art discussed above, in accordance with an aspect of the present invention, there is provided a device for organizing and storing one or more of the adapters provided with rechargeable devices that includes: (i) an AC power supply to provide ready access to electricity for the adapters to permit one or more of the adapters to operate simultaneously; (ii) a mechanism for storing excess adapter wiring; and (iii) a mechanism to permit the consumer to selectively extend or retract the wire of the adapter on an as-needed basis depending on the circumstances and application. The above are preferably accomplished so as to allow for an uncomplicated placement of an adapter into the organizer unit and, when it is needed for travel, a similar uncomplicated removal of an adapter from the organizer unit.

In accordance with another aspect of the present invention, there is provided an organizer for organizing and storing one or more of adapters provided with rechargeable devices. The organizer comprises: an AC power supply to provide access to electricity for the adapters to permit one or more of the adapters to operate simultaneously; a storing mechanism for storing excess adapter wiring; and an extension/retraction mechanism adapted to permit selective extension or retraction of the wire of the adapter.

In accordance with yet another aspect of the invention, there is provided a brake/retention unit for securing one or more connection ends of respective power adapters. The brake/retention unit secures the one or more connection ends, the adapters of which are secured in a wire retraction unit, and comprises: (a) a brake/retention unit base, the base having an opening to permit connection ends of adapter wires to pass through the base; and (b) one or more brake retention mechanisms engaged with the base, each mechanism operable to engage with a respective connection end portion of a power adapter, each brake retention mechanism comprising: (i) a spring retainer, the spring retainer being adapted to flex to an open position to allow a connection end of the adapter wire to pass, and to spring back to a closed position in which the connection end cannot pass back through the spring retainer; and (ii) a brake unit comprising a first rubber brake pad and a second rubber brake pad, the first and second rubber brake pads being oriented with respect to one another to allow a connection end portion of an adapter wire to be lodged, by frictional force, between the rubber brake pads when the connection end is extended from the organizer unit, to prevent retraction of the connection end into the organizer unit.

In one preferred embodiment, the present invention incorporates, within a housing, one or more electrical outlets, for example a row of two-prong ungrounded electrical outlets satisfactory for use with commercially available adapters, and an integrated circuit breaker wired to a single cord that plugs into an available wall outlet. These outlets provide for a distribution of electricity within the unit.

Also, in a preferred embodiment of the present invention, there is provided within the housing of the organizer unit a spool which functions to wind up and store excess adapter wire that is not needed when the adapter is used within the organizer unit, and a spring loaded mechanism that allows a user to withdraw from the housing a relatively slackened portion of the adapter wire not wound up on the spool, the spring loaded mechanism tending to urge the connection end of the wire, which protrudes from the unit during recharging, back into the unit until the wire is pulled out again by the user.

DETAILED DESCRIPTION OF THE PREFERRED EMBODIMENTS

Preferred embodiments of the present invention will now be discussed with reference to FIGS. 1 through 11.

Figure 1:
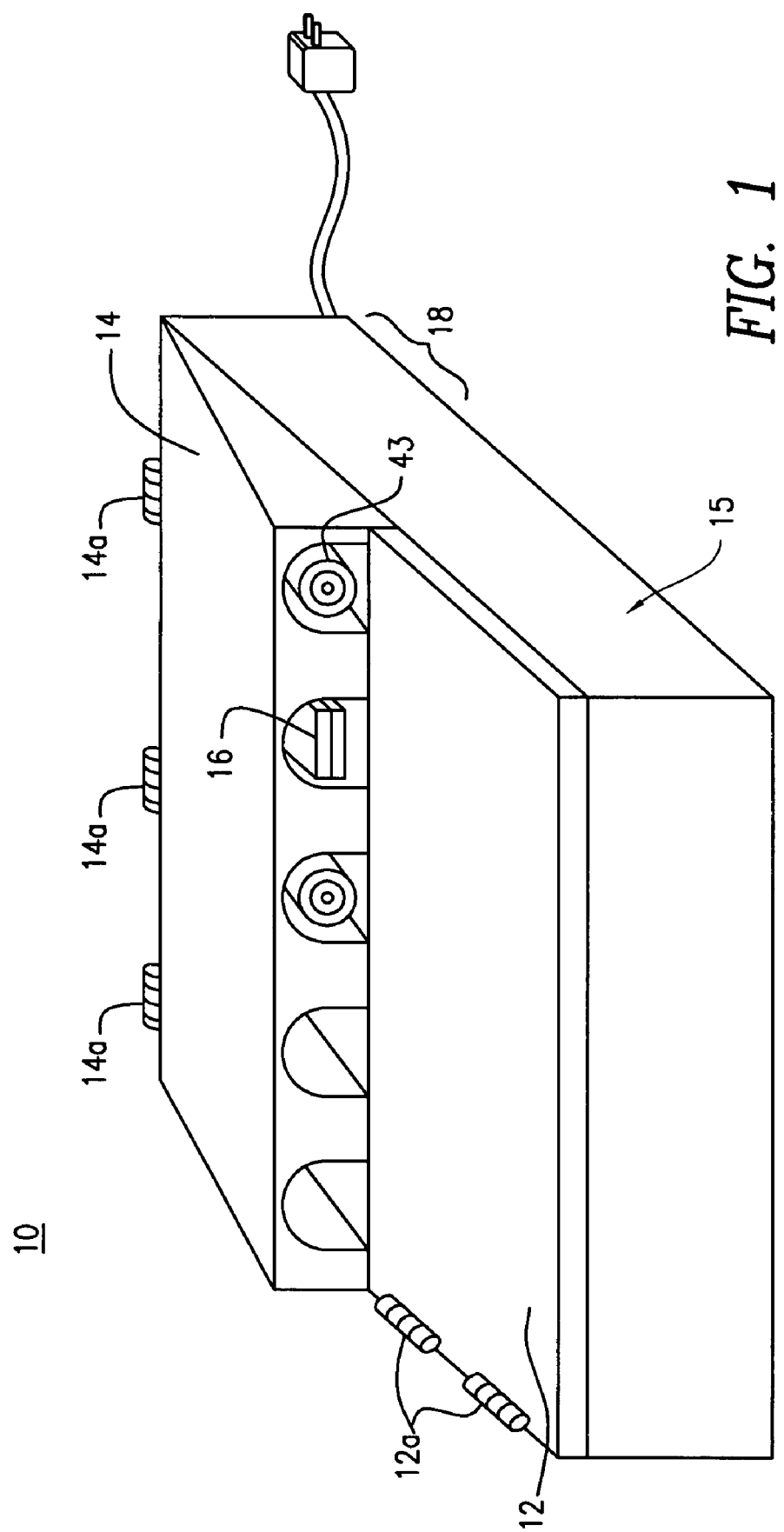
FIG. 1 is a perspective view of the organizer unit of the present invention in a closed condition.

As shown in FIG. 1, the organizer unit 10 in accordance with a preferred embodiment of the present invention has an external structure that includes a main unit lid 12, having main hinges 12a, and a brake retention housing lid 14, having retention housing hinges 14a. The lids are attached to a main housing 15 by means of the hinges. Connection end openings 16 are formed in the brake retention housing lid 14 and allow the connection ends from the adapters to protrude from within the housing 15 for access to the rechargeable devices that will preferably rest on top of the main unit lid 12, as will be discussed in more detail below.

A brake retention housing 18 is a portion of the interior of the housing 15 under the brake retention housing lid 14. The brake retention housing 18 includes within it a brake retention unit or arm, supporting one or more brake retention mechanisms. Each brake retention mechanism prevents a respective connection end from being retracted fully into the housing unit 15 when not in use, and allows the connection ends to be extended from the connection end openings 16 and not retreat when the connection end is extended while in use.

Figure 2:
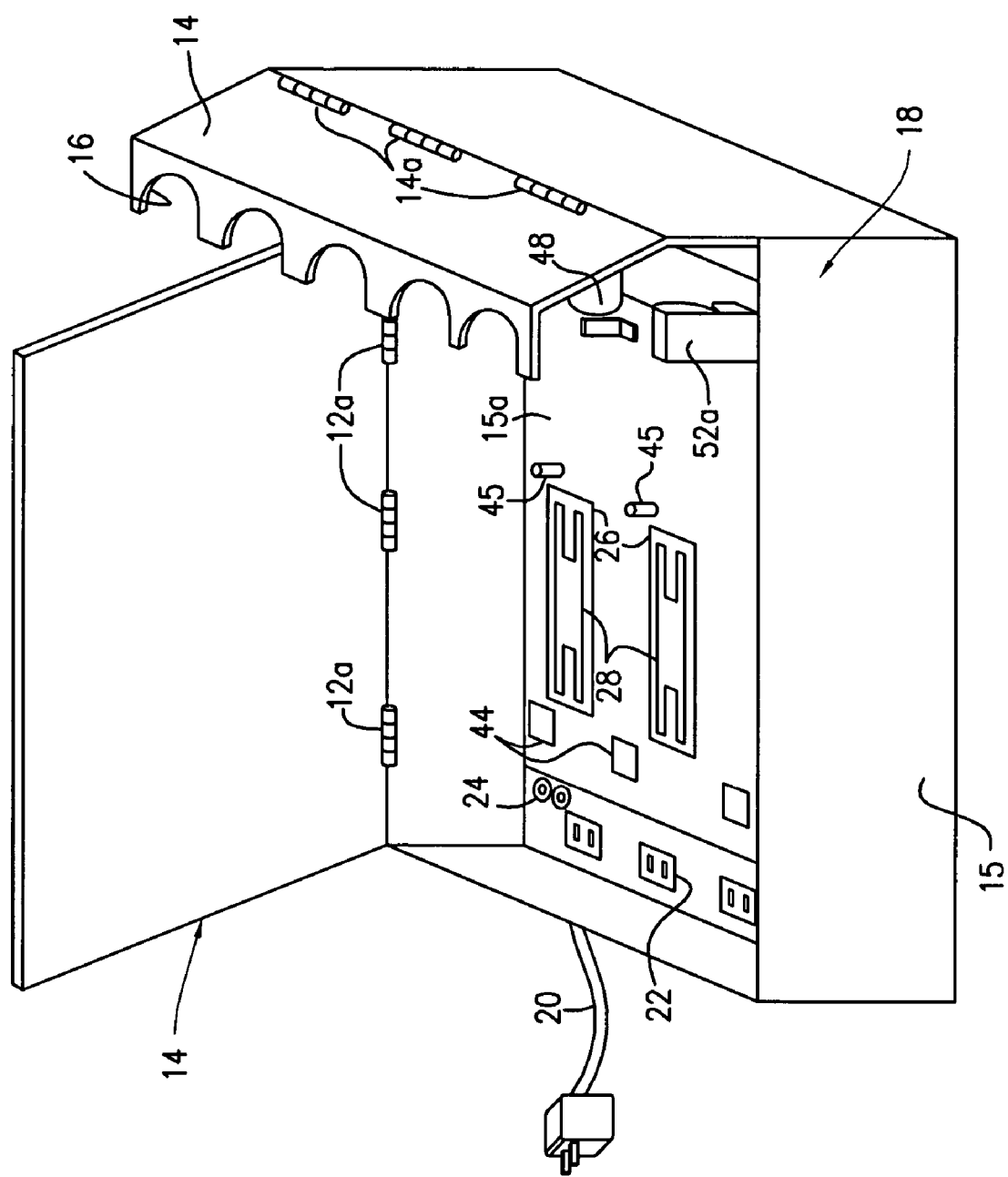
FIG. 2 is a perspective view of the organizer unit of FIG. 1 with the lids in an open condition.

As shown in FIG. 2, the internal structure of the organizer includes a unit plug 20, which plugs into, for example, a wall AC outlet. The unit plug 20 supplies AC power to internal electric outlets 22, into which the various adapters will be plugged. The unit advantageously includes a circuit breaker 24 for safety reasons, as are known to those skilled in the art.

Base 15a of the interior of the housing 15 has wire spool bays 26, each of which holds within it a wire spool 28. Each wire spool 28 functions to store an excess length of wire associated with an adapter. As will be discussed in greater detail below, at least a portion of the length of the adapter wire 42a will be stored and neatly out of the way by being wrapped around the wire spool 28. A portion of the wire 42a towards the connection end is left unwound, and will be fed along a path towards the connection end opening 16. Wire clips 44 are affixed to a portion of the wire 42a of each adapter and, in combination with a spring mechanism 40, function to provide an urging force which tends to pull a slack portion of the wire 42a not wrapped around the spool, i.e., a portion of the wire 42*a* closer to the connection end, towards the interior of the housing 15. The action of the spring mechanism 40 and clip 44 will be discussed further below.

In a preferred embodiment, the wire spool 28 is preferably oblong, and the wire spool bay 26 within which it resides is shaped to accommodate the oblong spool. The shapes of the spool 28 and wire spool bay 26 serve to reduce the vertical profile within the interior of the unit, allowing the unit to take up less space vertically. Also, an oblong spool can advantageously accommodate more wire for the same vertical height than a round spool, assisting in maintain a lower profile for the unit.

A further advantage of the use of an oblong spool is that it will not move or come loose when it has been inserted into its storage bay. Moreover, a round spool may give the consumer the false impression that the spool is functionally related to the retraction mechanism, which is not the case in the embodiment illustrated in the FIGS. 1–10.

The wire spool 28 fits within the wire spool bay 26 within the housing base 15*a*. As can be clearly seen in FIG. 3, the wire spool bay 26 includes a spring-and-ball retention system comprising spring/ball retainer 32, which functions to hold the spool 28 while it is in the bay 26. In particular, preferably, the spool includes a detent, or other indentation, into which the ball is placed, to keep the spool in place, for example when the unit is moved. However, the spool can be removed by the user by pulling it out of the bay with enough force to overcome the holding force exerted by the ball on the detent. This system keeps the spool from coming out of the bay during normal operation, yet permits the easy removal of the spool for travel by the user.

In addition, when the adapter is removed, the remaining wire 42*a* at the connection end can be wound around the spool as a convenient and neat way to transport the adapter for travel. Preferably, each of the spool bays 26 is removable. When removed, this area of the housing 15 will be large enough to accommodate the larger transformers typically included with camcorders and lap-top computers.

Figure 3:
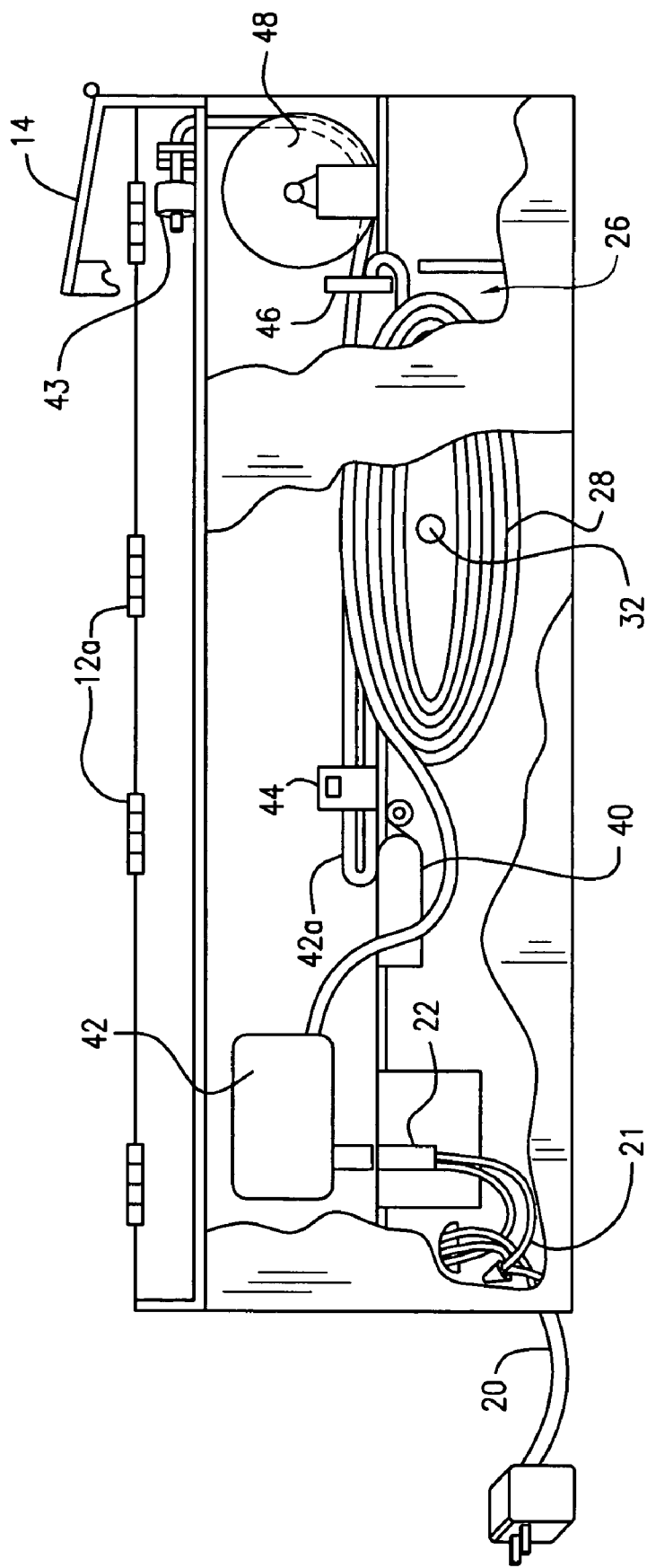
FIG. 3 is a cutaway side view of the organizer unit showing a single element of the organizer.
Figure 4:
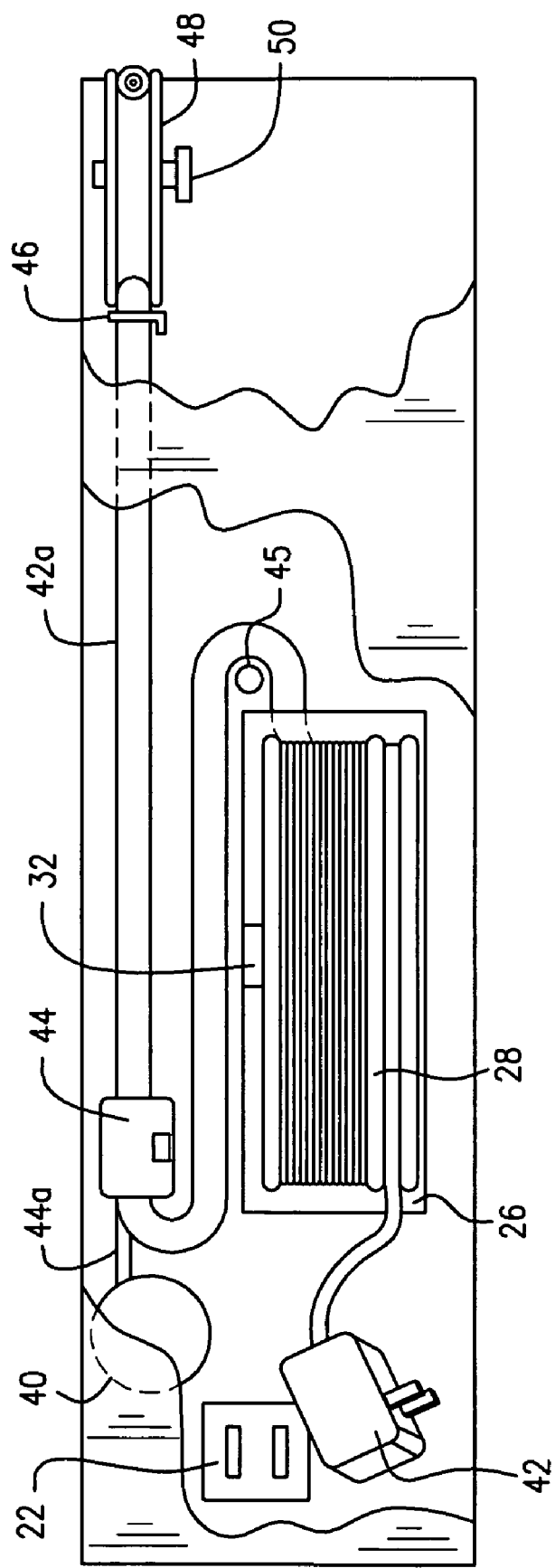
FIG. 4 is a top view of a single element of the organizer.
Figure 5B:
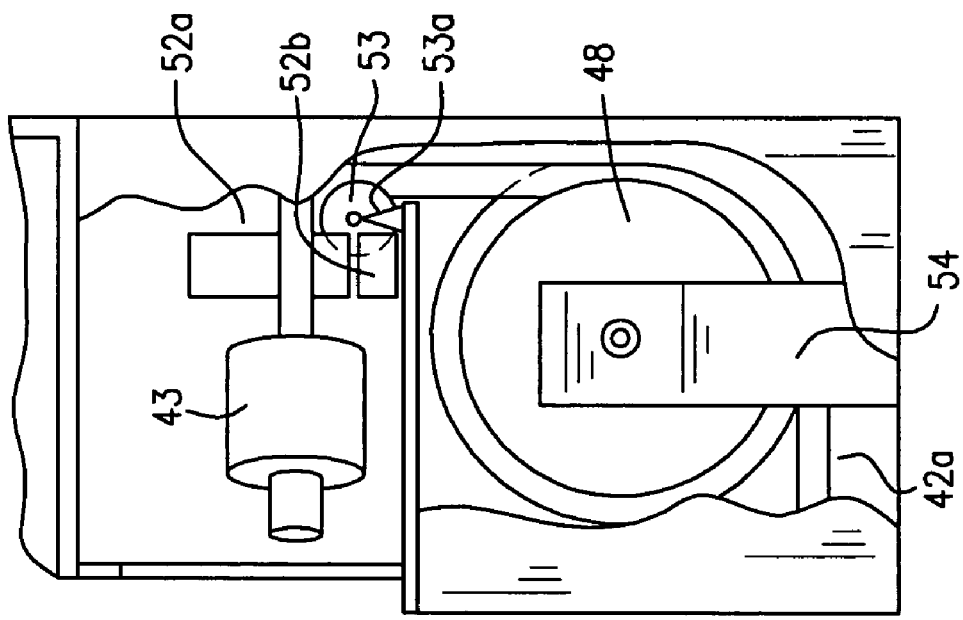
FIG. 5 shows two cutaway views of the brake retention mechanism of the present invention.
Figure 5A:
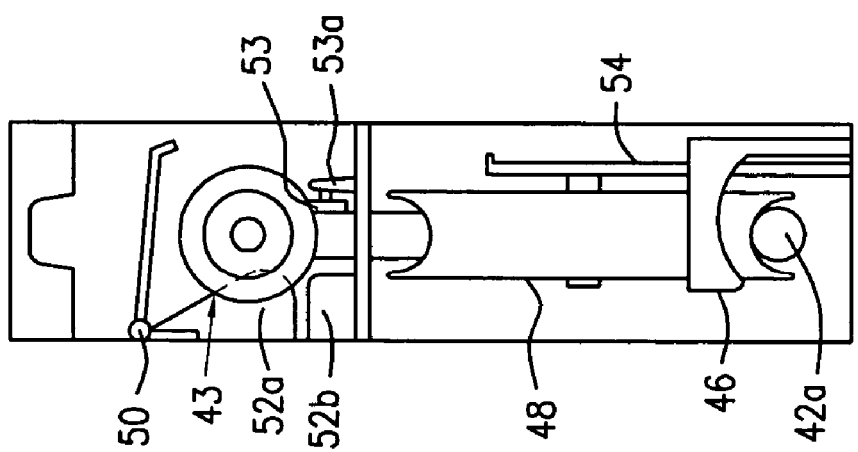

The basic operation of the adapter organizer unit will now be described with reference to FIGS. 3 and 4, which constitute a cutaway side view and top view, respectively, of an "element" of the organizer unit, and FIG. 5, which shows two views of details of a brake/retention mechanism. For purposes of discussion, an "element" of the organizer unit 10 comprises an electric outlet, a bay and spool for wire storage and the retraction mechanism for one particular adapter. It will be appreciated that the organizer unit 10 of the present invention may include, for example side by side, plural elements, as shown, for example in FIGS. 1 and 2, discussed above, and FIG. 6, to be discussed in greater detail below.

As can be seen in the figures, a first portion of the wire 42*a* that is not wound around the wire spool 28 is guided first around wire guide post 45. In order to permit extension and retraction of the connection end 43 of the wire 42*a*, a clip 44 is provided that is secure enough to hold wires 42*a* of varying gauges tightly without damaging them. At a point further along the wire 42*a*, i.e., closer to the connection end 43, the clip 44 is attached to the wire 42*a*. The clip 44 is connected, for example by means of a string 44*a*, to a spring mechanism 40 attached to the housing 15 of the unit 10. Preferably, as shown in the figures, the spring mechanism 40 is located beneath the housing base 15*a* and a hole is provided in the base 15*a* to allow the string 44*a* to protrude through the base and connect to the clip 44.

The spring mechanism 40 functions to exert a pulling force, tending to urge the string, and hence the clip 44 to which it is attached, towards the spring mechanism 40. This urging force tends to reduce any slack in a distal portion of the adapter wire 42*a*. The adapter's connection end 43 is prevented from being drawn into the unit 10 by the operation of spring loaded retention mechanism that includes the brake pads 52 and spring retainer 50, best shown in FIG. 5, which is discussed in greater detail below.

The distal end portion of the adapter wire 42*a* (i.e., the portion of the wire 42*a* towards the connection end 43) is fed parallel to the base 15*a* of the housing 15 and then under a guide roller 48, at which point the wire 42*a* turns 90° upwardly from the base and is then pressed through a spring loaded retention mechanism that comprises the spring retainer 50 and brake pads 52. The retention mechanism holds the fitting of the connection end 43 and prevents the fitting of the connection end 43 from being pulled back into the housing 15. The guide roller 48 is supported by a guide roller support 54, which is securely mounted within the unit 10, and which allows the guide roller 48 to rotate freely.

The maximum amount of wire extension to be extracted at the top of the unit is preferably a function of the distance between the position of clip 44, in its fully retracted condition, and the position of clip stop 46, which is located just before the guide roller 48. The clip stop 46 is attached to the housing 15 and is located so as to stop the wire 42*a* from being extracted further than the amount required to reach the rechargeable unit. When the user pulls the wire 42*a* out of the unit, the clip 44 will contact the clip stop 46, which will arrest the extraction of the wire 42*a*, preventing it from being extracted further. Because it is intended that the rechargeable device being charged will rest on top of the main unit lid 12 of the housing, the distance that the wire 42*a* can be extended does not need to be much longer than that required to allow the connection end 43 to reach approximately the mid point of the flat surface of the top of the unit, i.e., the top of the closed main unit lid 12.

When the user extends the connection end 43 from the housing 15, the clip 44 moves with the wire 42*a* to which it is attached, and toward the guide roller 48. This has the effect of loading the spring mechanism 40, which exerts an urging force tending to pull the clip 44, and the wire 42*a*, back to the spring mechanism 40.

Once the wire 42*a* has been extended so that the connection end 43 is extracted to the desired length, the wire 42*a* is held in place by the user pulling the wire 42*a* sideways, toward the center point of the connection end openings. This will hold the extracted wire 42*a* in place because the pulling action pulls the wire 42*a* under the guide roller 48 and over an upper guide wheel 53, mounted with support 53*a*, into the brake 52 consisting of two rubber pads or stops 52*a* and 52*b* separated by a thin opening, into which the wire 42*a* is inserted. The shape of the rubber stops 52*a* and 52*b* of the brake 52 is designed to guide the wire 42*a* into the opening. The wire 42*a* is held in the brake 52 by friction created between the rubber pads 52*a* and 52*b* and the wire 42*a*. The spring retainer 50 is a spring clip that is configured to allow the connection end 43 to pass through and then not let it retract back into the unit. Once the connection end 43 is pushed through the spring retainer 50, the spring retainer 50 closes behind it, forming, with two vertical posts attached to the brake retention base, and the brake retention base, a square smaller in circumference than the connection end, thus blocking the connection end from going back into the housing. If it is required to have the connection end 43 retracted into the housing, the user can manually adjust the spring retainer 50 to allow for the connection end 43 to be withdrawn into the housing.

When the user is finished using the adapter 42, for example, when charging of the rechargeable device has been completed, he or she simply unplugs the connection end plug 43 from the rechargeable device and moves the wire 42a out of the brake opening. This removes the wire 42a from between the rubber brake pads 52a and 52b and permits the spring mechanism 40 to retract the wire 42a, by the urging force exerted by the string 44a attached to the clip 44, thus retrieving the wire 42a to its original starting position.

Figure 6:
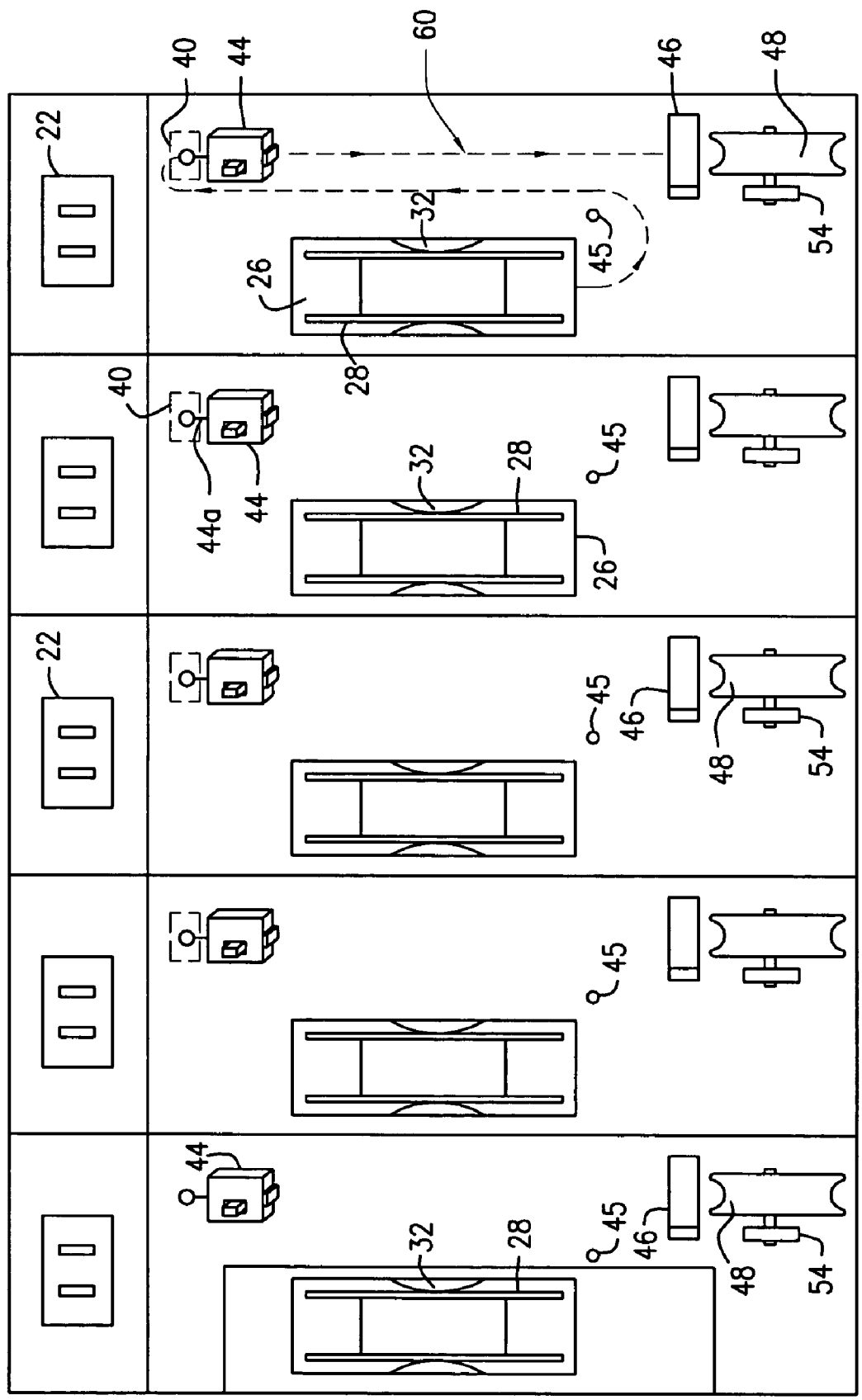
FIG. 6 is a top view of a multi-element embodiment of the organizer unit of the present invention.

FIG. 6 is a top down view of the adapter unit 10, shown with the lids removed. Components that have been discussed in connection with other figures will not be discussed again. FIG. 6 shows the wire path 60 along with the slack portion of the adapter wire 42a will be drawn. As discussed above, the portion of the wire 42a not wound on the wire spool 28 is drawn around the guide post 45, and then attached to the clip 44. The spring mechanism 40 is shown in phantom to indicate that it is located below the base 15a of the housing. The string 44a protrudes through the base 15a and attaches to the clip 44, the operation of which has been described above.

Figure 7:
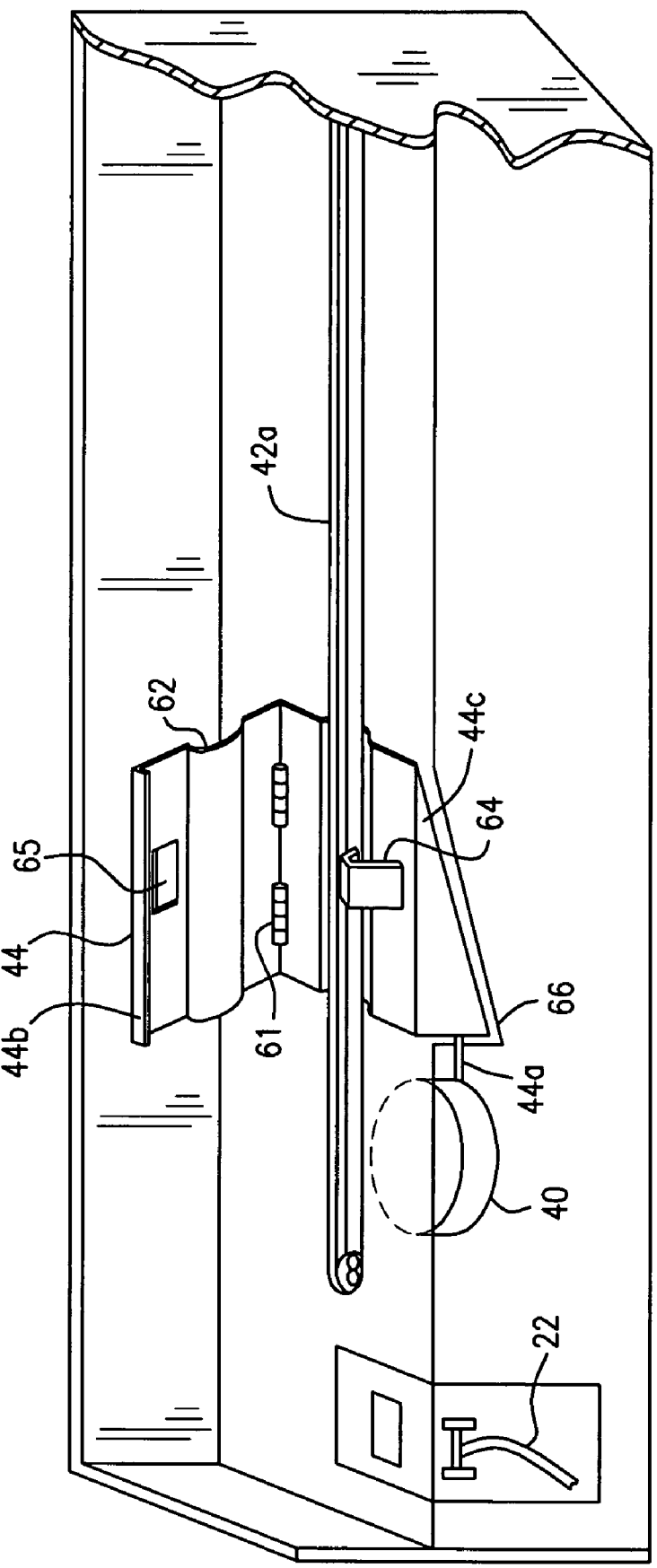
FIG. 7 is a cutaway view showing structural details of an embodiment of the clip and spring mechanism of the present invention.

FIG. 7 is a cutaway view of a single element of the adapter unit showing the detailed structural elements of the clip 44 according to a preferred embodiment. As can be seen in the figure, the clip 44 is preferably a hinged two-piece unit comprising upper portion 44b and lower portion 44c. Hinges 61 allow to clip unit to move from an open position to a closed position. In the closed position, clasp 64 engages a female counterpart 65 on the upper portion to securely close the clip 44 around the wire 42a. Friction enhancing pad 62 ensures that the clip 44 will not slip with respect to the wire 42a. The housing base 15a is preferably constructed to have an indentation 66 to arrest backward motion of the clip 44.

Figure 8:
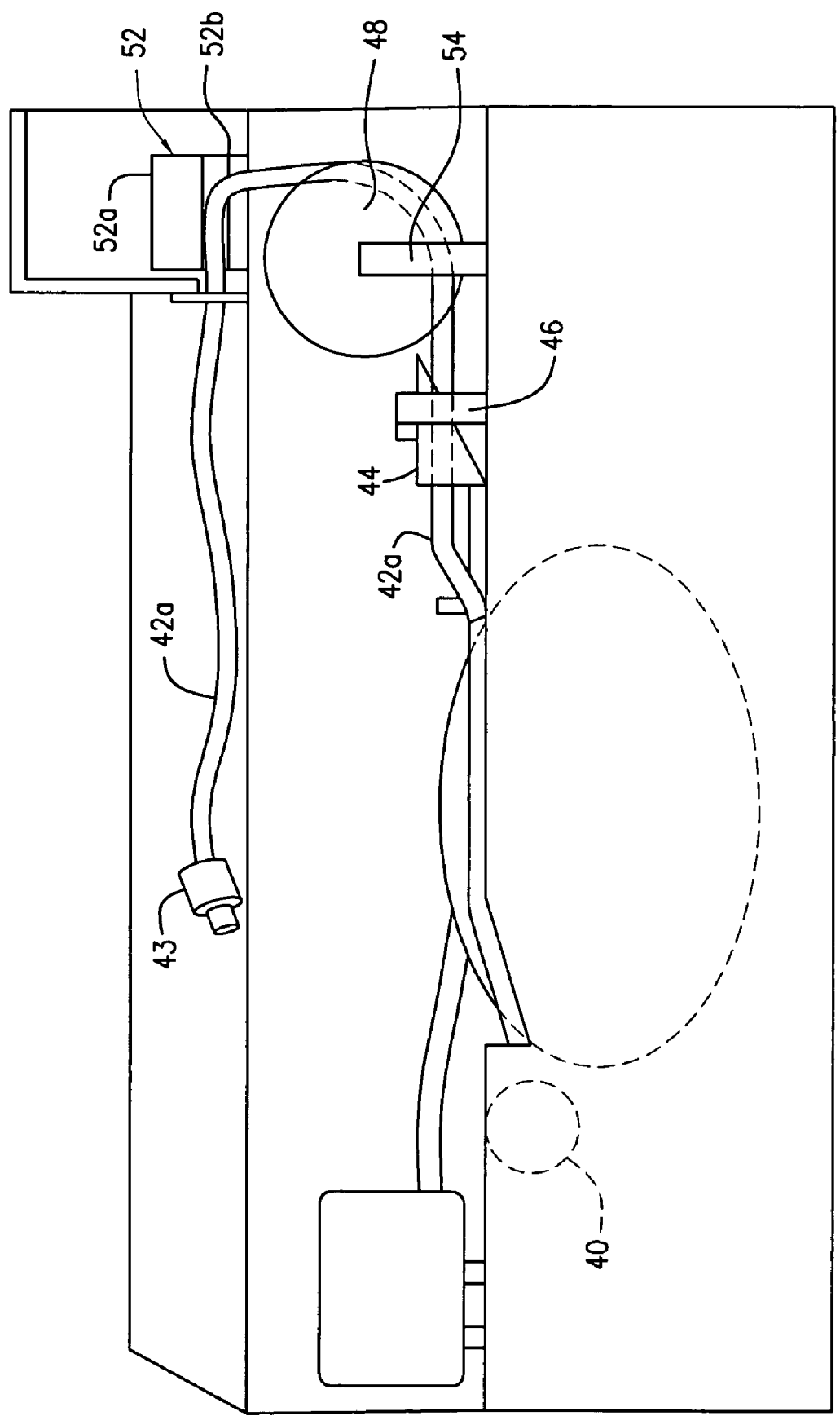
FIG. 8 is a side cutaway view of an element of a preferred embodiment of the present invention, showing the connection end extended for connection to a rechargeable device.
Figure 9B:
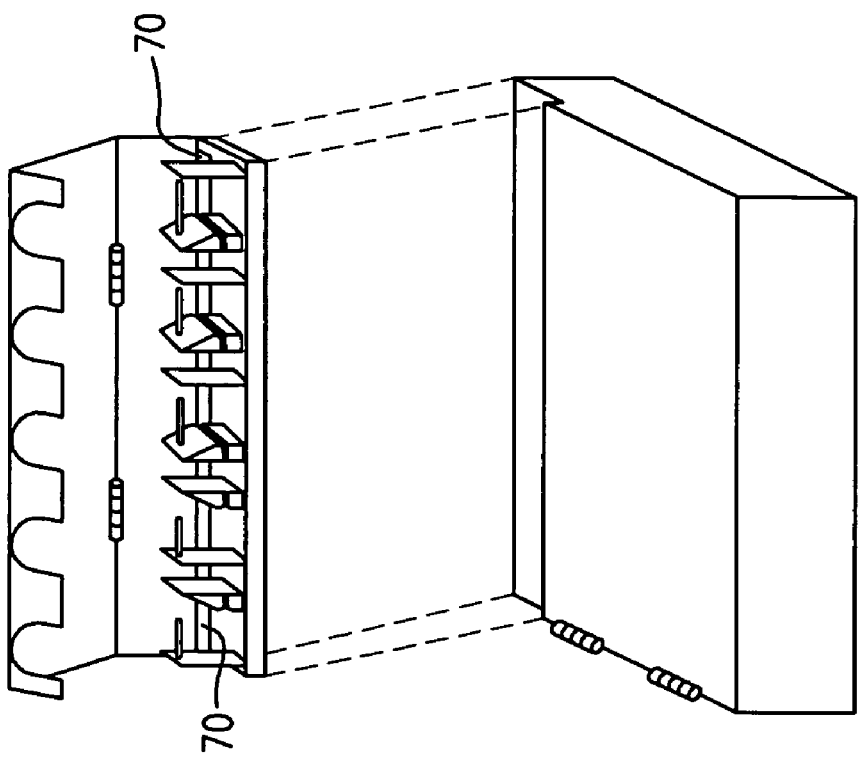
FIGS. 9A and 9B are perspective views of the organizer of the present invention showing the separability of the retention brake arm.
Figure 9A:
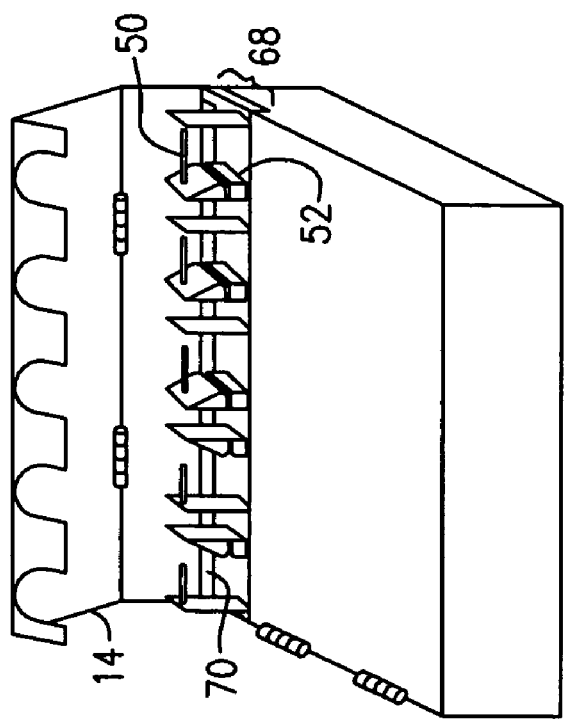

FIG. 8 is a side cutaway view showing a element of the unit 10 with the wire 42a extended to a position suitable for connecting to a rechargeable device. As is shown in the figure, in this position, a portion of the wire is held between the brake pads 50 by frictional forces so that the connector end 43 is not pulled back towards the interior of the housing 15. In this extended position, the clip 44 is resting against the clip stop 46 so as to prevent further extension of the wire 42a. Note that although the clip 44 is shown to be flush with the base 15a, the present invention is not limited to this embodiment and the clip 44 can be of any shape appropriate for its intended purpose of arresting extension of the wire 42a upon encountering clip stop 46.

The present invention can also utilize the extra length of wire that is otherwise wound on the spool to permit the portion of the unit housing the brake/retention mechanism to be separable from the base of the unit, which functions as a wire retraction unit. This separable unit will be referred to hereinafter as a brake/retentions arm 68, and is shown most clearly in FIGS. 9A and 9B. This separability allows the brake/retention mechanisms in the arm 68 to be located at a distance from the base. As in the previous embodiments, the wire retraction unit contains a mechanism for urging the wires back into a housing of the wire retraction unit. However, when the brake retention arm 68 is located separately, less wire would need to be wrapped around the spool, for example.

In such an arrangement, the further the brake/retention arm 68 is from the base, the less wire needs to be wound on the spool 28. Advantageously, with such a configuration, the brake/retention arm 68 can be mounted at the level of a desk or counter, for example by means of extended leg supports, or by being built into the furniture or another housing unit, or by any other known means for support. If leg supports are used, they are preferably constructed so as to allow the height from the base unit to be adjustable, to allow the arm 68 to be located conveniently, for example, so as to be flush with the edge of a desk.

The above-described wire retraction technique is only one example of how this retraction function may be accomplished. Other variations of the retraction mechanism that can also be employed include a second embodiment in which a set of pinch rollers is used, and a third embodiment in which the electrical outlet is centered inside of a spool housing such that the outlet will rotate together with the wire as it extends and retracts.

Figure 10:
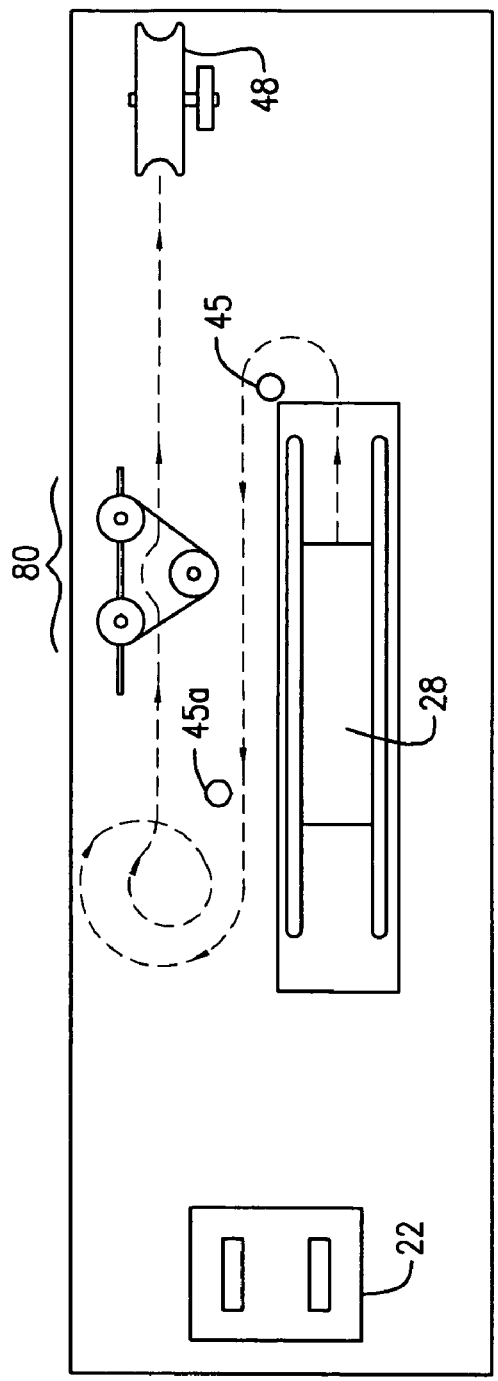
FIG. 10 is a top view of one element of a pinch roller variation of the retraction mechanism of the present invention.

In the second embodiment, as shown in FIG. 10, in lieu of the clip/string mechanism of the above-described embodiment, a set of pinch rollers 80 is employed to provide a force urging the connection end of the wire back towards the interior of the housing 15. The pinch rollers 80 are spring loaded and are shown in an open position. Once the wire is fed through the rollers, the rollers are brought together to contact the wire held therebetween. Due to the spring loaded nature of at least one of the pulley rollers, the force of manually extending the wire will rotate the rollers to load the spring mechanism, and the release of the wire permits the spring to recoil, thus turning the rollers in the opposite direction, to thereby retract, or "reel in" the wire that has been extended.

In this arrangement, the set of pinch rollers 80 preferably include a mechanism to permit the opposite sides of the set of pinch rollers to be separated creating an opening, as shown in FIG. 10, to insert the wire and then close the rollers with sufficient pressure to permit friction to move the rollers and wire together. This mechanism may be in accordance with any known method in the field of pinch rollers. To provide a change in direction of the wire towards the pinch rollers 80, a second guide post 45a is provided. The wire is wrapped around this second guide post 45a to change the direction of the wire, as shown in the figure.

Figure 11:
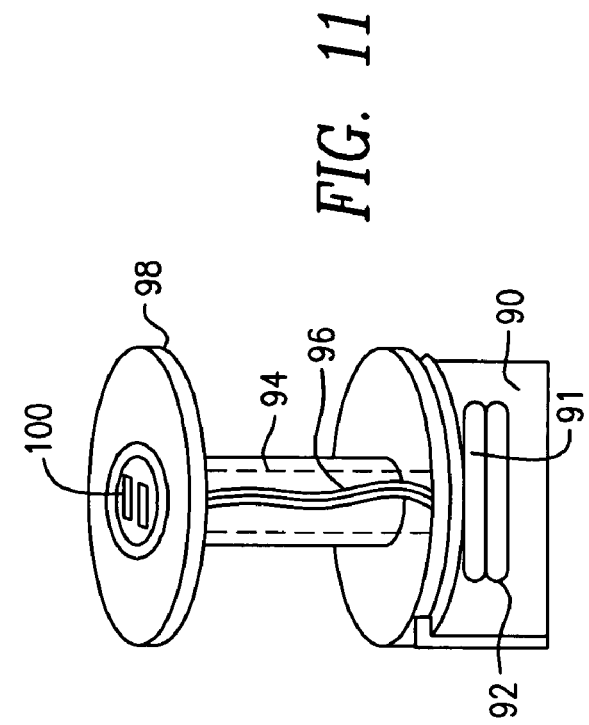
FIG. 11 is a perspective view of retraction mechanism according a third embodiment of the present invention.

The third embodiment includes a retraction mechanism that differs from the embodiments discussed above in that there is no oblong spool 28 for winding the extra unneeded portion of the wire. Instead, as is illustrated in FIG. 11, the third embodiment organizes each "element" into a vertical stack that include a rotating base 91 and a vertical shaft 94, at the top of which is located an electrical outlet 100. Wiring 96 is provided through the vertical shaft 94 to provide electrical power to the outlet 100, even the base 91 is rotated. The wire of the adapter, not shown, is spooled around a spool 98 designed to fit over the shaft 94. The connection end of the adapter, i.e., the end that engages the rechargeable device, is extended through the side of the housing and the force from the wire being extended turns the spool/base and outlet, loading the attached spring mechanism 92, preferably located in the base. The entire vertical stack is secured in a non-moving base 90, preferably provided in the base of the housing 15. When the wire is released, the spring recoils, the spool rotates in the opposite direction and the wire is retracted.

In the above-described embodiments, spring driven mechanisms are used to provide the necessary force for urging the connection end 43 into the housing 15. However, the present invention is not limited to this embodiment and any know manner of providing this urging force may be used. For example, a motor may used instead of the spring mechanism 40 in the first embodiment to provide an urging force.

In addition to variations in the spring design, alternatives to the brake mechanism are contemplated as well. The arrangement of the brake mechanism described in FIGS. 1–9 is preferred because of its simplicity and effectiveness. However, other arrangements include the use of a ratchet lock at the spring end of the mechanism (e.g., the spring in a roll-down window shade), a cam type mechanism or a manually operated lock. In any event, the present invention is not limited to any of the illustrated embodiments.

While preferred embodiments have been described above, those embodiments are illustrative in nature and do not limit the present invention, the scope of which is to be construed broadly in view of the claims appended hereto.

What is claimed is:

1. An organizer unit adapted to organize: (a) one or more adapters being connected to the organizer, for supplying power to one or more respective rechargeable devices; and (b) adapter wires respectively connected to the one or more adapters, the organizer unit comprising:
    a main housing having a base;
    one or more internal electrical outlets located within the housing, respective ones of the one or more internal electrical outlets supplying AC power to respective ones of the one or more adapters;
    one or more spools, each of said spools being adapted to store an unused portion of an adapter wire associated with a respective one of the adapters;
    one or more spring mechanisms, each of the spring mechanisms being affixed to the housing, each spring mechanism being cooperatively engaged with a respective connection end portion of an adapter wire to provide a force urging the connection end portion of the adapter wire towards the spring mechanism; and
    a brake, formed at an interface to an outside of the organizer unit, the brake being operative to hold the connection end portion such that a desired length of adapter wire is extended outside of the housing of the organizer unit for connection to a rechargeable device,
    wherein the brake comprises rubber brake portions and a spring retainer, the rubber brake portions being oriented with respect to one another to allow a connection end portion of the adapter wire to be lodged, by frictional force, between the rubber brake portions when the connection end is extended from the organizer unit, to prevent retraction of the connection end into the organizer unit.

2. The organizer unit of claim 1, wherein each spring mechanism engages a respective connection end portion of an adapter wire by a string connected to a clip attached to the adapter wire.

3. The organizer unit of claim 2, the organizer unit further comprising a clip stop, attached to the base of the housing, the clip stop preventing the connection end of the adapter wire from being extended more than a predetermined distance outside of the organizer unit.

4. The organizer unit of claim 1, further comprising one or more lids, at least one of the one or more lids including at least one connection end opening for allowing the connection end of an adapter wire to be drawn out of the housing of the organizer unit for connection to a rechargeable device.

5. An organizer unit adapted to organize: (a) one or more adapters being connected to the organizer, for supplying power to one or more respective rechargeable devices; and (b) adapter wires respectively connected to the one or more adapters, the organizer unit comprising:
    a main housing having a base;
    one or more internal electrical outlets located within the housing, respective ones of the one or more internal electrical outlets supplying AC power to respective ones of the one or more adapters;
    one or more spools, each of said spools being adapted to store an unused portion of an adapter wire;
    one or more spring mechanisms, each of the spring mechanisms being affixed to the housing, each spring mechanism being cooperatively engaged with a respective connection end portion of an adapter wire to provide a force urging the connection end portion of the adapter wire towards the spring mechanism; and
    a brake, formed at an interface to an outside of the organizer unit, the brake being operative to hold the connection end portion such that a desired length of adapter wire is extended outside of the housing of the organizer unit for connection to a rechargeable device,
    wherein each spring mechanism engages a respective connection end portion of an adapter wire by a string connected to a clip attached to the adapter wire, and
    wherein the clip comprises an upper portion and a lower portion, the upper and lower portions being cooperatively engaged with one another by means of hinges to allow for movement between an open position and a closed position, the adapter wire being held securely between the upper and lower portions in the closed position.

6. An organizer adapted to organize (a) one or more adapters being connected to the organizer, for supplying power to rechargeable devices; and (b) adapter wire respectively connected to the one or more adapters, the organizer comprising:
    internal electrical outlets to provide access to electricity for the adapters to permit one or more of the adapters to operate simultaneously;
    a storing mechanism for storing excess adapter wire by winding the excess adapter wire around a portion of said storing mechanism; and
    an extension/retraction mechanism separate from said storage mechanism adapted to permit selective extension or retraction of the adapter wire,
    wherein the extension/retraction mechanism comprises a spring mechanism affixed to a housing of the organizer, and a clip adapted to engage a portion of the adapter wire, the clip being cooperatively engaged with the spring mechanism and the adapter wire to permit selective extension and retraction of the adapter wire.

7. An organizer according to claim 6, wherein the storing mechanism for storing excess adapter wire comprises a spool.

* * * * *